Feb. 2, 1960     C. A. DAY     2,923,341
INSTANT TIRE CHAIN ASSEMBLY
Filed July 25, 1958
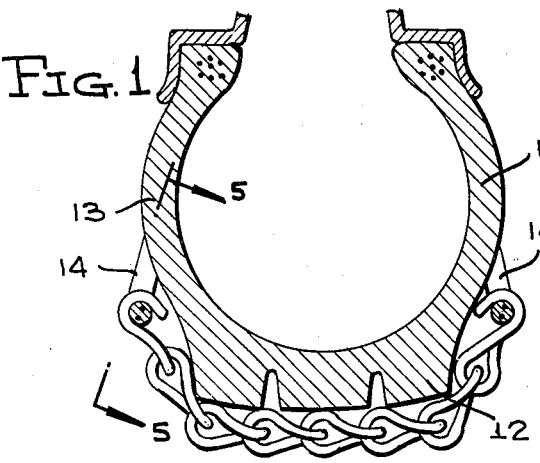
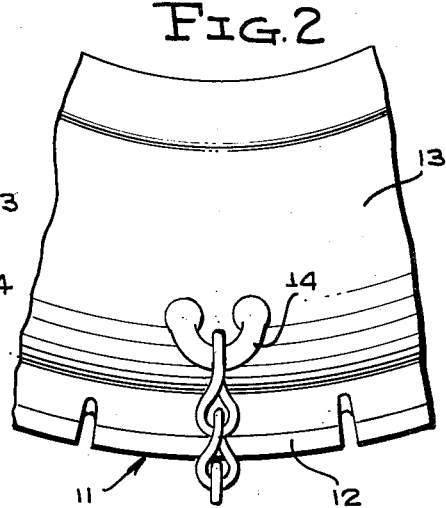
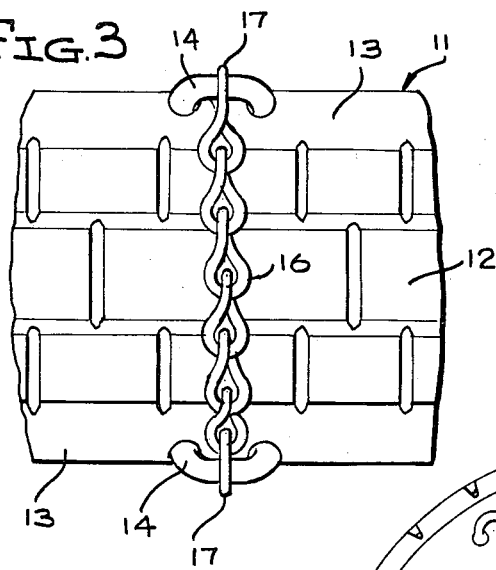
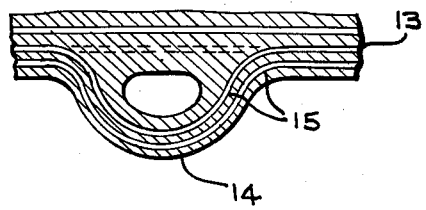
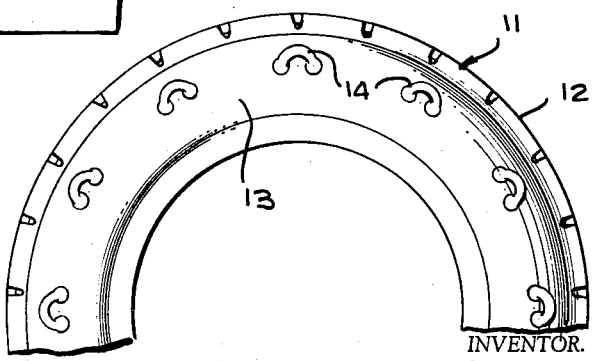
INVENTOR.
CHARLES A. DAY
BY
*McMorrow, Berman & Davidson*
ATTORNEYS

United States Patent Office 2,923,341
Patented Feb. 2, 1960

2,923,341

INSTANT TIRE CHAIN ASSEMBLY

Charles A. Day, Du Bois, Pa.

Application July 25, 1958, Serial No. 750,942

3 Claims. (Cl. 152—233)

This invention relates to improvements in anti-slip devices for motor vehicles, and more particularly to an improved tire and chain assembly.

The main object of the invention is to provide a novel and improved tire and chain assembly which involves simple elements, which provides easy and effective installation of chains whenever required, and which involves relatively inexpensive components.

A further object of the invention is to provide a novel and improved motor vehicle tire provided with means for quickly and easily connecting anti-skid chains thereto, the tire being inexpensive to manufacture, being durable in construction, and providing improved traction, especially on ice, which otherwise is not available without the use of chains.

Further objects and advantages of the invention will become apparent from the following description and claims, and from the accompanying drawings, wherein:

Figure 1 is a transverse vertical cross sectional view taken through a portion of a snow tire constructed in accordance with the present invention and provided with a chain element engaged therewith.

Figure 2 is a side elevational view of the portion of the snow tire illustrated in Figure 1.

Figure 3 is a plan view of the tread of the snow tire of Figures 1 and 2, showing the manner in which the chain element extends transversely thereacross.

Figure 4 is a fragmentary side elevational view of a substantial portion of the snow tire of Figures 1 to 3, said view being to a smaller scale than Figures 1 to 3.

Figure 5 is an enlarged cross sectional detail view taken substantially on line 5—5 of Figure 1.

Referring to the drawings, 11 designates a snow tire which comprises an annular outer tread portion 12 and annular side wall portions 13, 13 extending inwardly from the side margins of the tread portion 12. Designated at 14, 14 are respective pairs of apertured lugs or loop elements integrally formed on the side walls 13, 13 and projecting freely outwardly therefrom, said loop elements preferably projecting outwardly toward the tread portion 12 of the tire, as shown in Figure 4. The loop elements 14, 14 are arranged in pairs spaced evenly around the circumference of the tire 11, and are preferably reinforced by the inner fibers or cords of the tire, shown at 15 in Figure 5, whereby said loop elements are a unitary part of the tire structure. Since the loop elements are free and are integral with the side walls of the tire, said loop elements are relatively flexible.

Designated at 16 is a length of chain adapted to extend transversely across the tread portion 12 and provided at its opposite ends with hooks 17, 17 detachably engageable with a pair of loop elements 14, 14 in the manner illustrated in Figure 3. Respective chains 16 are provided to engage with the respective pairs of loops 14, 14, so that when the use of the chains are required, the chains may be quickly and easily connected to the loops 14, since the loops will flex to allow the hooks 17 to engage thereover, whereby said chains will provide the necessary traction required in a particular situation, for example, where the vehicle is required to travel over icy road surfaces.

As is well understood, while snow tires may be useful in relatively soft or loose snow and slush, said tires are not particularly effective on hard ice, and cannot provide required traction. However, it has been shown that chains will provide an adequate amount of traction for safe driving on hard ice, as well as under the conditions normally taken care of by snow tires.

Thus, a vehicle equipped with snow tires 11 may be quickly and easily further equipped with chain elements 16 when a situation requiring same is encountered by merely fastening the chain elements transversely across the treads of the tires by engaging the hooks 17, 17 of the chain elements with opposing lug elements 14, 14 on the side walls of the tires.

While a specific embodiment of an improved tire and chain assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tire, a body having an annular outer tread portion and annular unitary side walls extending inwardly from the side margins of said tread portion, said body being provided with inner reinforcing cords, and opposing pairs of freely flexible loop elements integrally formed on the intermediate portions of said side walls and projecting outwardly therefrom toward said tread portion, certain of said reinforcing cords extending through said loop elements, whereby said loop elements are a unitary part of the tire structure.

2. In combination, a tire having an annular outer tread portion and unitary annular side walls extending inwardly from the side margins of said tread portion, said tire being provided with inner reinforcing cords, opposing pairs of freely flexible loop elements integrally formed on the intermediate portions of said side walls and projecting outwardly therefrom toward said tread portion, certain of said reinforcing cords extending continuously through said loop elements, whereby said loop elements are a unitary part of the tire structure, respective chains extending transversely across said tread portion adjacent said opposing pairs of loop elements, and means on the ends of said chains detachably engaged with said loop elements.

3. In combination with a tire having an annular outer tread portion and unitary annular side walls extending inwardly from the side margins of said tread portion, said tire being provided with inner reinforcing cords, a plurality of uniformly spaced opposing pairs of freely flexible loop elements integrally formed on the intermediate portions of said side walls and projecting outwardly therefrom toward said tread portion, certain of said reinforcing cords extending continuously through said loop elements, whereby said loop elements are a unitary part of the tire structure, respective chains extending transversely across said tread portion adjacent said opposing pair of loop elements, and respective hooks secured on the ends of said chains and detachably engaged with said loop elements.

References Cited in the file of this patent

UNITED STATES PATENTS

| | | |
|---|---|---|
| 1,223,724 | Otto | Apr. 24, 1917 |
| 2,078,764 | Kielmansegg | Apr. 27, 1937 |